United States Patent
Daniello et al.

(10) Patent No.: US 8,131,692 B2
(45) Date of Patent: Mar. 6, 2012

(54) METHOD ALLOWING VALIDATION IN A PRODUCTION DATABASE OF NEW ENTERED DATA PRIOR TO THEIR RELEASE

(75) Inventors: Rudy Daniello, Nice (FR); Sophie Desmonceau, Grasse (FR); Benoit Janin, Biot (FR); René Jullien, Nice (FR); Brigitte Ruscica, Grasse (FR)

(73) Assignee: Amadeus s.a.s, Biot (FR)

( * ) Notice: Subject to any disclaimer, the term of this patent is extended or adjusted under 35 U.S.C. 154(b) by 382 days.

(21) Appl. No.: 12/372,809

(22) Filed: Feb. 18, 2009

(65) Prior Publication Data

US 2010/0211550 A1    Aug. 19, 2010

(30) Foreign Application Priority Data

Feb. 17, 2009  (EP) .................................. 09305151

(51) Int. Cl.
*G07F 17/30* (2006.01)
(52) U.S. Cl. ........................................................ 707/700
(58) Field of Classification Search ..................... None
See application file for complete search history.

(56) References Cited

U.S. PATENT DOCUMENTS

| | | | | |
|---|---|---|---|---|
| 4,587,434 A * | 5/1986 | Roes et al. ..................... 250/556 |
| 4,868,877 A * | 9/1989 | Fischer ........................... 713/157 |
| 5,021,953 A * | 6/1991 | Webber et al. ..................... 705/6 |
| 5,295,067 A * | 3/1994 | Cho et al. ......................... 705/29 |
| 5,331,546 A * | 7/1994 | Webber et al. ..................... 705/6 |
| 5,592,618 A * | 1/1997 | Micka et al. ..................... 714/54 |
| 5,743,429 A * | 4/1998 | Morofsky ........................... 221/7 |
| 6,014,637 A * | 1/2000 | Fell et al. ....................... 705/26.8 |
| 6,039,164 A * | 3/2000 | Waters et al. .................. 194/206 |
| 6,055,529 A * | 4/2000 | Furlani .......................... 707/758 |
| 6,059,650 A * | 5/2000 | Stoltz et al. ..................... 453/40 |
| 6,289,452 B1 * | 9/2001 | Arnold et al. .................. 713/175 |
| 6,292,830 B1 * | 9/2001 | Taylor et al. ................... 709/224 |
| 6,330,006 B1 * | 12/2001 | Goodisman .................... 715/762 |
| 6,581,093 B1 * | 6/2003 | Verma ........................... 709/220 |
| 6,654,932 B1 * | 11/2003 | Bahrs et al. ................... 715/210 |
| 6,804,658 B2 * | 10/2004 | Lim et al. ..................... 705/7.31 |

(Continued)

OTHER PUBLICATIONS

Kistler, James et al., "Disconnected Operation in the Coda File System," Feb. 1992, ACM Transactions on Computer Systems, vol. 10, No. 1, pp. 3-25.*

(Continued)

*Primary Examiner* — Farhan Syed
(74) *Attorney, Agent, or Firm* — Young & Thompson

(57) ABSTRACT

A method of insuring the integrity of a plurality of updates brought in real-time to a production database concurrently used by one or more software applications is described. The production database includes a plurality of products participating to the definition of objects. The method first includes requesting the issuance of a unique filing number associated to a draft state version of the plurality of updates while keeping them invisible to the end-users of the production database. Then, a set of product items identified as a whole by the unique filing number are created or copied from the production database and gathered under the form of a meta-product on which the plurality of updates is applied. After updating, the meta-product is successively set into a customizable flow of one or more validation states in order to perform a cross-validation of the plurality of updates. After validation, the meta-product is set into a production state where the uniquely identified meta-product becomes immediately visible and useable by the end-users.

15 Claims, 3 Drawing Sheets

U.S. PATENT DOCUMENTS

| | | | |
|---|---|---|---|
| 6,975,914 B2* | 12/2005 | DeRemer et al. | 700/96 |
| 7,146,535 B2* | 12/2006 | Little et al. | 714/26 |
| 7,177,773 B2* | 2/2007 | Lonn et al. | 702/81 |
| 7,242,991 B2* | 7/2007 | Budinger et al. | 700/95 |
| 7,299,234 B2* | 11/2007 | Focazio et al. | 707/703 |
| 7,325,014 B1* | 1/2008 | Kennedy | 1/1 |
| 7,349,854 B2* | 3/2008 | Frederick | 705/330 |
| 7,386,511 B2* | 6/2008 | Buchanan et al. | 705/45 |
| 7,430,498 B2* | 9/2008 | Butterfield et al. | 703/2 |
| 7,469,817 B2* | 12/2008 | Brumfield et al. | 232/7 |
| 7,493,335 B2* | 2/2009 | Gold et al. | 1/1 |
| 7,590,647 B2* | 9/2009 | Srinivasan et al. | 1/1 |
| 7,593,859 B1* | 9/2009 | Owens et al. | 705/7.28 |
| 7,624,914 B2* | 12/2009 | Brumfield et al. | 232/7 |
| 7,793,166 B2* | 9/2010 | Benhanokh et al. | 714/54 |
| 7,840,425 B2* | 11/2010 | Isnardon et al. | 705/5 |
| 2003/0115093 A1* | 6/2003 | Lim et al. | 705/10 |
| 2003/0196191 A1* | 10/2003 | Hartman et al. | 717/126 |
| 2005/0087424 A1* | 4/2005 | Newsome et al. | 194/320 |
| 2005/0178639 A1* | 8/2005 | Brumfield et al. | 194/350 |
| 2007/0233529 A1* | 10/2007 | Isnardon et al. | 705/6 |
| 2007/0233530 A1* | 10/2007 | Blaszka et al. | 705/6 |
| 2007/0270997 A1* | 11/2007 | Brumfield et al. | 700/214 |
| 2008/0126841 A1* | 5/2008 | Benhanokh et al. | 714/5 |
| 2008/0127047 A1* | 5/2008 | Zhang et al. | 717/104 |
| 2008/0179394 A1* | 7/2008 | Dixon et al. | 235/380 |
| 2008/0183758 A1* | 7/2008 | Kennedy | 707/104.1 |
| 2009/0171909 A1* | 7/2009 | Bank et al. | 707/3 |
| 2009/0313292 A1* | 12/2009 | Mohamad | 707/102 |
| 2010/0094578 A1* | 4/2010 | Schneider et al. | 702/84 |
| 2010/0199328 A1* | 8/2010 | Heins et al. | 726/3 |
| 2010/0211550 A1* | 8/2010 | Daniello et al. | 707/687 |
| 2011/0010326 A1* | 1/2011 | Neale et al. | 706/47 |
| 2011/0093303 A1* | 4/2011 | Isnardon et al. | 705/5 |

OTHER PUBLICATIONS

Seshadri, Praveen, et al., "SQL Server for Windows CE—A Database Engine for Mobile and Embedded Platforms," ICDE 2000, pp. 1-3.*

Shanker, Udai, et al, "Distributed real time database systems: background and literature review," Jan. 26, 2008, Springer Science, Distributed Parallel Databases, vol. 23, pp. 127-149.*

* cited by examiner

METHOD ALLOWING VALIDATION IN A PRODUCTION DATABASE OF NEW ENTERED DATA PRIOR TO THEIR RELEASE

FIELD OF THE INVENTION

The present invention relates generally to the updating of large databases and more specifically to a method allowing validation in a production database of new entered data prior to their release.

BACKGROUND OF THE INVENTION

In an increasingly interconnected world all significant providers of goods and services have to set up large and, most often, very-large databases holding the characteristics, specifications and costs of their products, services and global commercial offers. Operated under the control of a database management system (DBMS) contents are made accessible, simultaneously, to many online customers from all over the world, and also to the authorized administrators in charge of keeping database contents updated. In this environment databases must often be operated in real time, in a 24-hour-a-day/7-day-a-week mode.

In the airline industry, examples of such very-large database platforms are the ones that hold the airline fares along with the rules restricting their use. Fare databases are mainly set up by a few worldwide global distribution systems (GDSs) that provide travel services to all the actors of the travel industry and more specifically to traditional travel agencies and also to all sorts of other online travel service providers. For instance, AMADEUS (trademark) is a world leading GDS.

One large provider of fares is the airline tariff publishing company (ATPCO), an organization owned by a number of domestic and international airlines that collects and distributes the latest airfares of many airlines around the world on a multi-daily basis. Another provider of fares is called SITA, a similar international organization. ATPCO and SITA provide fare data in an electronic form suitable for computer processing including all the rules associated with those fares. Fares and rules provided by airlines and coded by ATPCO and SITA are electronically transmitted to the GDSs mentioned above for being incorporated into their fare databases.

ATPCO and SITA are not however the only sources of fares for the GDS fare databases. A GDS like AMADEUS also provides software tools that let third-party fare providers file fares directly into its fare and pricing database platform. Indeed, a good deal of fares created on a daily basis by airline companies, and travel service companies on behalf of airlines, is negotiated fares. Contrary to public fares, negotiated fares are contracted between, e.g., an airline company and a particular travel agency or travel organization for its private use. They are often filed directly into GDS fare database thus bypassing ATPCO and SITA.

However, direct filing of fares does not go without posing its own set of problems. The fare and pricing database platform is a complex and very-large database which is continuously in use and must sustain real-time commercial transactions while being updated. Especially, filing of new fares along with the associated data such as the rules that restrict their use and the available routes requires that many transactions all complete successfully before actually getting a consistent set of updated data tables that can translate into new useable fares.

It is thus the object of the invention to describe a technique to update a large database, such as a GDS fare database, without disturbing its normal operation while its updating (i.e., entry of new fares) is in progress. It is a specific object of the invention to allow a validation of the new fares before they become visible and can be actually used by the end-users of the database.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The invention describes a method of insuring the integrity of a plurality of updates brought in real-time to a production database concurrently used by one or more software applications. The production database includes a plurality of products participating to the definition of objects. The method first comprises the step of requesting the issuance of a unique filing number associated to a draft state version of the plurality of updates while keeping them invisible to the end-users of the production database. Then, a set of product items identified as a whole by the unique filing number are created or copied from the production database and gathered under the form of a meta-product on which the plurality of updates is applied. When updating is complete, the meta-product is successively set into a customizable flow of one or more validation states in order to perform a cross-validation of the plurality of updates. Finally, when validation is complete, the meta-product is set into a production state where the uniquely identified meta-product becomes immediately visible and useable by the end-users of the one or more software applications.

The invention may also comprise optionally one of the following features:

The customizable flow of one or more validation states includes a manual validation state which does not allow the update of the meta-product.

The customizable flow of one or more validation states includes an applicative validation state which allows simulating the one or more software applications on the meta-product.

The meta-product is merged with whichever non updated production products that are necessary to simulate the one or more software applications on the meta-product.

The applicative validation state allows updating and deleting data from the meta-product.

The applicative validation state allows displaying by the one or more applications the meta-product as if it were a production product.

The customizable flow of one or more validation states allows returning the meta-product to the draft state if cross-validation of the plurality of update fails.

The customizable flow of one or more validation states allows setting the meta-product into the production state.

The production state only allows an expert team to update the meta-product.

The production state allows updating any product.

The customizable flow of one or more validation states includes only a manual validation state.

The production database is a database of fares and the one or more software applications include a pricing engine.

The invention also concerns a computer program product stored on a computer readable storage medium, comprising computer readable code means for causing at least one computer to operate the above method.

The invention further concerns a server side or a client side of a computer program product stored on a computer readable storage medium, comprising computer readable code means for causing at least one computer to operate the above method.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

Figure 1:
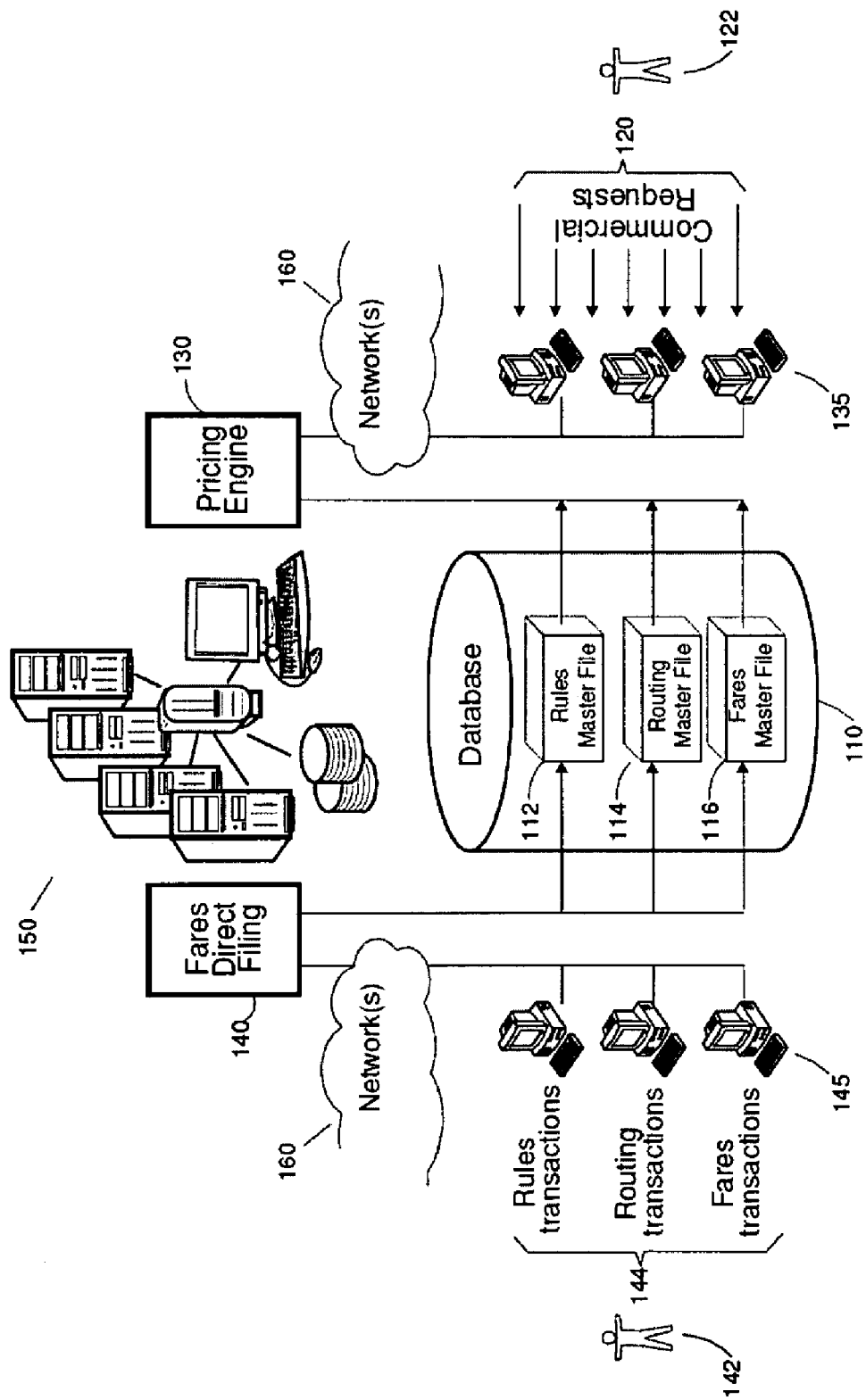
FIG. 1 shows an example of a large continuously operational database for which the updating technique of the invention best applies.

FIG. 1 shows an example of a large continuously operational database for which the updating technique of the invention best applies.

The database (110) of this example used to illustrate the invention is a fare database of the kind set up by GDSs from their large computing and storing resources (150) to allow pricing of travel solutions. This example is chosen to enhance the understanding of the invention and does not limit the invention to fare databases or to commercial offers. GDS resources are made available online through any combination of networks including the Internet (160) and the use of the corresponding standard protocols. The pricing requests are received (120), e.g., from the traditional travel agencies affiliated to the GDS to complete travel commercial transactions on behalf of the travelers, clients of the travel agencies. Pricing requests are also received from numerous online travel sites in order to price the travel solutions selected by end-users of the sites. Whichever the source of the pricing request, a pricing engine application (130) operated by the GDS uses the fare database to establish the cost of the travel solutions. Pricing requests are issued by agents of travel agencies from their computer terminals and by end-users typically accessing various online travel sites from their personal computers through a standard client application, i.e.: a web browser or a navigator (135).

As mentioned in the background section new fares are created on a daily basis. Direct filing of fares is achieved through a dedicated software platform (140) running from GDS computing resources in a standard client/server mode. Then, the direct filing software platform let fare providers manually file negotiated fares from the corresponding client applications (145) through a graphic user interface (GUI). Negotiated fares are fares that result of agreements and contracts signed between, e.g., airlines and travel agencies and, generally, between any fare providers and any travel service providers that do not use the services provided by ATPCO or SITA.

The present invention includes a computer program product (140) stored on a non-transitory computer readable storage medium (150), which product includes computer readable code means for causing at least one computer to operate the method of the invention. The present invention also includes a server side or a client side of a computer program product (145) stored on a non-transitory computer readable storage medium, which product includes computer readable code means for causing at least one computer to operate the method of the invention.

The introduction of new fares must be done in real-time however without disturbing the regular operation of the database which remains continuously interrogated through the pricing engine (130) in order to answer the commercial requests (120) issued from the here above mentioned travel agencies and online travel sites, i.e., by travel agents and individual end-users of the sites (122). The fare database is comprised of several elements, hereafter referred to as products. Said products participate to the definition of objects which are for instance global commercial offers in the described example. The products must be consistently updated to eventually get a valid fare that becomes commercially useable. The products are updated through independent dedicated transactions (144) with the database. Transactions are issued by those in charge of entering, updating or deleting fares through the direct filing software platform (140) provided by the GDS. They are broadly referred to as the filing team (142) in the following. Creation, update or deletion of data are performed manually. The products include the rules (112) that translate the terms and conditions of the negotiated contract in the form of restrictions that apply when buying the new fare. The routes on which the new fare applies are defined in a second product (114) while the individual fare amounts are in a third product (116). There are at least as many transactions to issue as products to update. Then, the main problem lies in the fact that all product modifications are becoming immediately visible to the pricing engine (130) while a new fare is being created. This may cause incoherencies as long as not all the transactions have actually completed so that all products are updated in a coherent way for the new fare and also made compatible with all the already existing fares.

Another problem tied to the fact that all modifications are immediately visible is that no validation of the new fares is in practice possible. Air fares are particularly complex and subject to the application of many rules. The parties involved in a negotiated fare (e.g., an airline and a travel agency) cannot however conveniently preview how a contract translates into a new fare unless it is actually also made immediately available for the regular commercial transactions. A new fare cannot be built and tested in advance by the filing team, i.e., before the date it is scheduled to be released and put in production mode.

Figure 2:
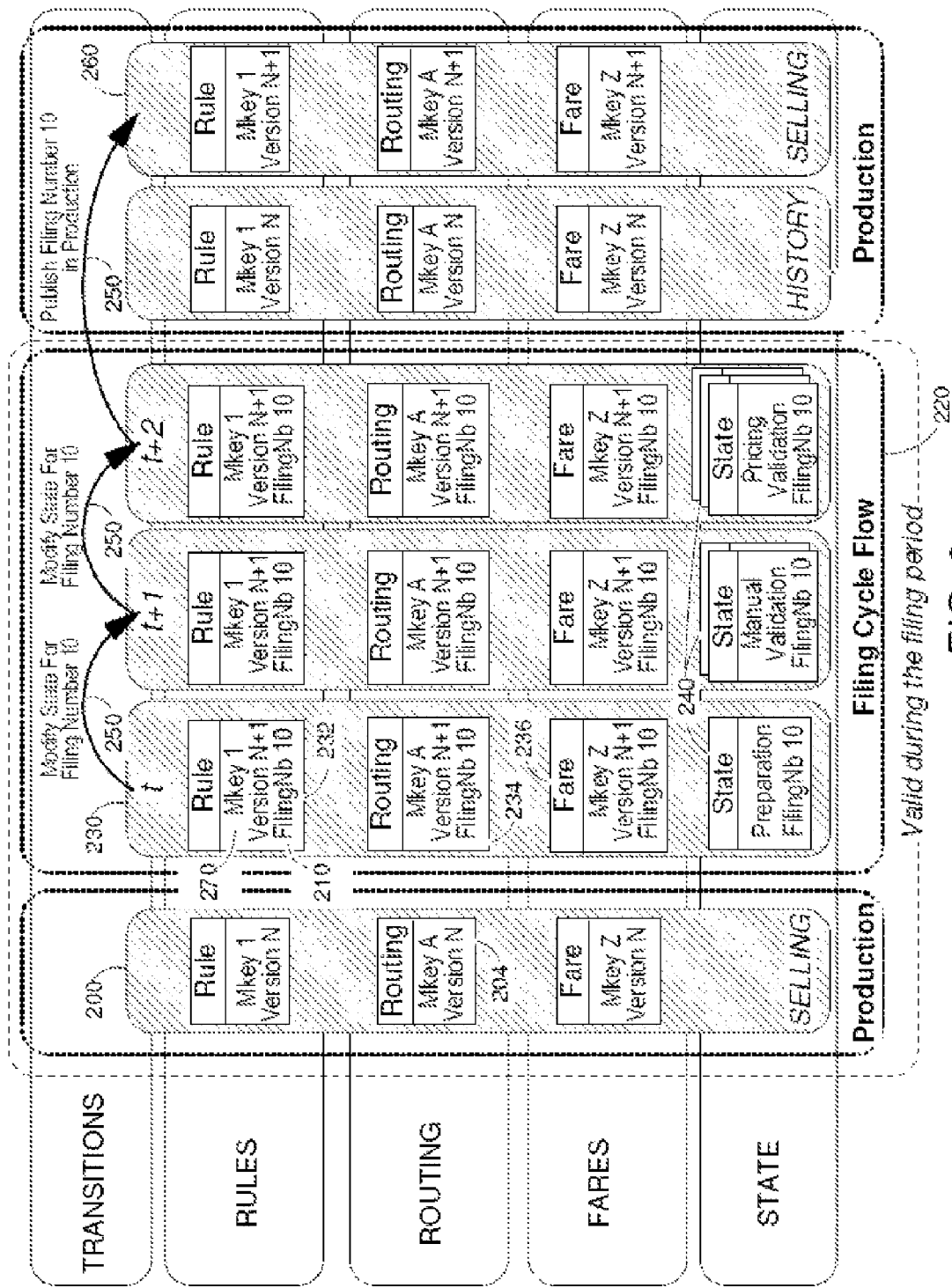
FIG. 2 describes the means used by the invention to update products of a continuously operational database during a filing cycle flow that controls the visibility of the updates until they are put in production.

FIG. 2 describes the means used by the invention to update products of a continuously operational database during a filing cycle flow that controls the visibility of the updates until they are put in production.

The coherence of the updates on several products part of a global commercial offer is achieved through the use of a filing number (210). The filing number is made unique and its validity is linked, as further discussed, to the filing cycle flow (220) to which it belongs. It is attached to any update done on any of the products defined in the database. A filing number thus uniquely identifies a particular update among a set of updates. Hence, all the data tagged with a same filing number form a meta-product (230) which is managed as a unique entity by the system. The filing team is responsible of the identification of the set of updates and of its functional coherence.

A filing cycle flow (220) is made of states and transitions:

A state (240) is associated with a filing number (210). It determines the actions that can be done on the set of data (230) identified by the filing number. The last state of the filing cycle flow corresponds to the publication of the data (260) when updates are put in production. When this state is reached the filing number becomes obsolete. A new unique filing number will be needed if more updates have to be processed.

A transition (250) is an action which changes the state of a set of data to another one. As further discussed in the following, from a state, several transitions are proposed to the filing team in order to possibly reach another intermediate state before updates are eventually put in production. It is always possible to publish the data in production from any state and also to delete the corresponding whole set of data if update session must be canceled. Only the data already in production (200-260) can not be removed from the system because they may have been already used to price and sale tickets.

Based on the above concepts of states and transitions a filing cycle flow can thus be customized to fit the needs of a particular filing team and way of working of their organization. This customizable flow of validation states is further discussed in FIG. 3.

To guarantee the coherence of the system some restrictions apply through:

The granularity of the update in each master file (set of database tables dedicated to a product) is determined by a set of identification fields called Mkey's (270). Only one filing number (210) is permitted to be associated with an Mkey so that there is possibly only one cycle of updates active at a time on a given set of data (230).

Any new filing must always start from the existing data (200) if any. At the end of the current filing cycle flow, the new data are merged with the old ones. They must be kept coherent.

On an implementation point of view, a state (240) is a field stored in a database table. It qualifies a set of data identified by a unique filing number. The association filing number-state is stored in a separate table. Each time the state is modified for a given filing number a new association is created and kept in the filing cycle flow (220). The filing number is attributed at the beginning of the filing cycle and used by the filing team to identify a set of updates concerning several products in the database. The last attributed filing number is stored in a dedicated table.

On the product side, a new version is created for each Mkey (270) at the beginning of the filing cycle flow: it is either a brand new Mkey, when the data do not already exist in the master file, or it is a copy of the existing data in production. During the whole filing cycle flow, only the last update of the data is kept in the database. For a given filing number, there is only one version of an Mkey. However, several Mkey's of a product can be identified by the same filing number.

Figure 3:
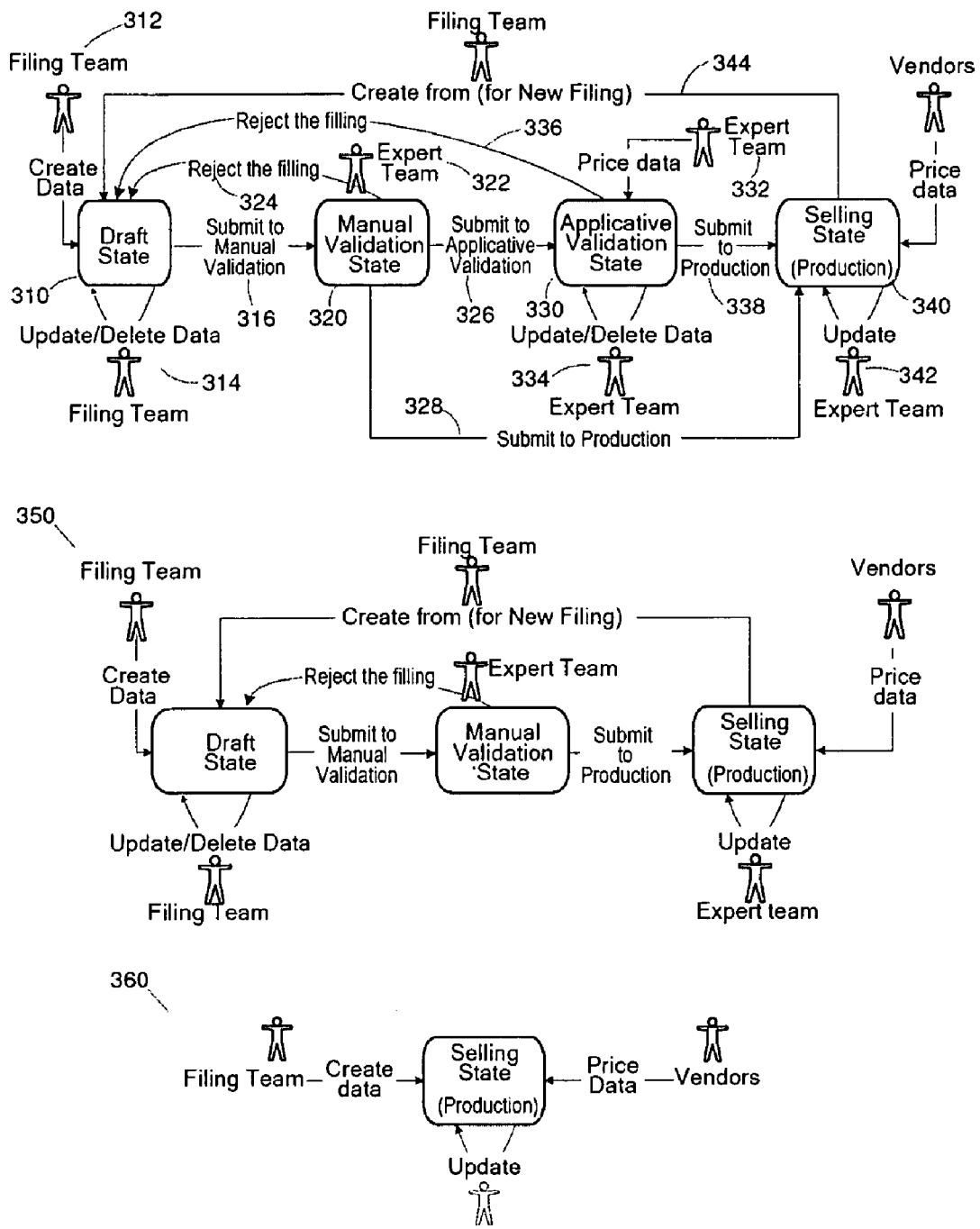
FIG. 3 is an example of an updating cycle flow including up to four states with the corresponding transitions.

As further discussed in FIG. 3, the filing system of the invention is thus open and flexible enough to let the filing team in charge of creating new fares for an organization to customize the filing cycle flow (220) to their organization's needs by having an appropriate number of intermediate validation states before a new fare is released and used in production. The management of the filing activity is done directly in the production database. For a given set of data, two versions can live together in the database: one corresponding to the production activity, one corresponding to the filing activity. As soon as the version under validation is promoted, it becomes the new version targeted by the pricing engine.

This way of filing has many advantages. The database needs not to be duplicated. Only the products being updated exist in two versions. Indeed, a possible solution to the problem solved by the invention would be to have a standby duplicated database in which all updates would be done and checked before the standby database is put in turn in production replacing the active database at scheduled times. This way of doing presents drawbacks in comparison with the invention. Indeed, such solution requires to manage and store two large and complex databases. Also, contrary to what is feasible with the filing system of the invention, an update could not be put in production as soon as it has been thoroughly checked since it would have to wait the next scheduled swapping to become visible by the end-users of the database.

Also, the filing team does not need to create a version for all products defined in the database but only for the ones that must be modified. Even though products are not all modified the validation of the updates can be conducted normally. In this case, the filing system of the invention just retrieves the non-updated products necessary to perform the validation. Necessary non-updated products and updated products are thus merged to permit the validation of the updated products.

With the example used to illustrate the invention, if only the rule product (232) and the fare product (236) need to be modified; then, the non-updated other product of this example, i.e., the routing product (234), needs not actually to be included (as shown in FIG. 2) in the meta-product identified by a unique filing number (210). In which case, the filing system of the invention, to perform the validation of the updates, will just pick by default the production version of the non-updated product (204) instead. This avoids the creation of useless data in the database, i.e. the duplication of production versions without modification.

FIG. 3 is an example of a filing cycle flow including up to four states with the corresponding transitions.

The defined states are as follows:

| | |
|---|---|
| Draft | The draft state (310) corresponds to the preparation phase, when the filing team is entering (creating) new data (312) into the production database with the filing system of the invention. While in this state, members of the filing team can do as many updates (314) as necessary on the new entered data. When done new data is normally submitted (316) to the next validation state. It is worth noting here that the new entered data (referenced by a same filing number) can be all deleted as long as they have not been promoted to the last state: the production state (where they become visible and can be used immediately by a pricing engine). |
| Manual validation | The manual validation state (320) corresponds to a first identified type of validation to be done by specialized members of an expert team (322). In the example of the fare database used to illustrate the invention, this state corresponds to the validation of the non price able elements of the new fare (rules and routes). While in this state, updates are forbidden in order to keep unchanged the data being currently validated. Manual validation may lead to reject the filing (324) so that to get back to the previous state (where data can be further modified by the filing team). Otherwise, the new entered data are possibly submitted (326) to a second type of validation. A third option may consist in submitting (328) the new entered data directly to the last state, i.e.; to the production state (340). |
| Applicative validation | The applicative validation state (330) corresponds to a second identified type of validation by specialized members of an expert team. In the example of the fare database this corresponds to the validation of the price able elements of the new fare by the team of fare experts (332) which may invoke the pricing engine as if the new entered data were already published. In this state, which is normally intended to finalize the filing, fare updates are allowed (334) because this phase is most of the time done assuming the new entered data are indeed price able (since the other elements have already been validated at previous state). The new data can however be |

| | |
|---|---|
| | rejected (336) by the expert team if necessary. If not, the new data can be submitted any time after to the production state (338). The transition to the production state can thus be postponed until the date chosen to release the new fare. |
| Selling | The selling state (340) corresponds to the production state. When the data are published they become immediately available to the pricing engine. To maintain full compatibility with the legacy filing system updates in the production state are permitted (342) so that the changes made by members of the expert team can still be made immediately visible to the pricing engine as in the legacy system. Also, the filing team is left with the opportunity of using production data (344) to start with when creating a new fare rather than entering a whole new set of data. |

The above exemplary filing cycle can be adapted to any organization's needs. The number of states is not limited. New requirements may be considered and new states added to the flow if necessary. A state defines the actions allowed on the data so that they can be updated, deleted, processed or just only read. Also the permitted transitions to and from the states are part of the definition of the filing cycle. The definition of a new state must be coherent with the existing flow and it can imply the development of new actions.

The exemplary filing cycle of FIG. 3 can also be simplified as shown in (350) where there is only one validation state. And, as already mentioned above a single production state can be considered (360) in which case the modifications become immediately visible to the pricing as in legacy systems.

Hence, the foregoing described database filing system retains from legacy systems the ability, for the filing teams and their organizations, to react in real time to the competition because the database updates can still be made instantaneous (360).

Yet, the filing of new contracts may also include optional preparation and validation phases that can be tailored to fit any organization management needs:

The filing of a new contract can represent a big volume of data to be entered that may span several days. In the meantime the filing system of the invention prevents new entered data to be accessed by the pricing engine.

Once the whole contract is filed in the database, contents can still be thoroughly checked in the actual production environment before it is published. For the exemplary fare database used to describe the invention this part is mostly done by experts of the travel client company or by the airlines themselves when the filing has been contracted out. A filing cycle (350) including a simple validation, called manual validation, based on the consultation of the data stored in the database or an extraction from the database in a report, can be performed. A more thorough validation, called applicative validation (330), based on the actual processing of the data by the pricing engine as if they were already published, can optionally be performed as well.

Finally, the database filing system of the invention let filing or expert teams control the publishing of a new contract anytime after the validation has completed so that contract can safely be prepared in advance and, possibly, withdrawn until the last state (production state) is not entered.

While the enhancements that the invention provides are particularly advantageous for airline industry, the scope of the invention extends to other transportation modes such as train, car, bus, ferry etc. Then data to be updated may correspond to fares related to air, ground, rail or sea products.

The scope of this invention also extends to hotel industry and the data to be updated may correspond to hotel fares/rates. Although the invention is described above in connection with an example involving fares and commercial offers, its scope extends to all kind of data for which it is advantageous to insure integrity of updates brought in real-time to a production database. For instance, the production database can include products participating to the definition of an industrial manufacturing process. In this case end-users may be industrial machines or technicians.

The invention claimed is:

1. A computer-implemented method of ensuring an integrity of a plurality of updates brought in real-time to a production database concurrently used by one or more software applications, the production database including a plurality of products participating to a definition of objects, the method comprising steps of:
    requesting an issuance of a unique filing number associated to a draft state version of the plurality of updates keeping invisible to end-users of the production database, the plurality of updates;
    in the production database, creating or copying from the production database, a set of product items identified as a whole by the unique filing number and gathered under a form of a meta-product on which the plurality of updates is applied;
    in the production database, updating the meta-product on which the plurality of updates has been applied;
    when updating of the meta-product is complete, in the production database, successively setting into a customizable flow of one or more validation states the meta-product in order to perform a cross-validation of the plurality of updates, wherein the customizable flow of one or more validation states allows returning the meta-product to the draft state when cross-validation of the plurality of updates fail, each validation state qualifying actions are performed on the meta-product identified by the filing number, the validation state is a field stored in association with the filing number in a specific table;
    when validation of the meta-product is complete, setting into a production state the uniquely identified meta-product which becomes immediately visible and useable by the end-users of the one or more software applications;
    wherein said creating or copying step, said updating step, said validation step, and said setting step are each perform while the production database is concurrently accessed by the end-users; and
    wherein said meta-product cannot be accessed by the end-users during said creating or copying step, said updating step, and said validation step.

2. The method of claim 1 wherein the customizable flow of one or more validation states includes a manual validation state (320) which does not allow the update of the meta-product.

3. The method of claim 1 wherein the customizable flow of one or more validation states includes an applicative validation state (330) which allows simulating the one or more software applications on the meta-product.

4. The method of claim 3 wherein the meta-product is merged with whichever non updated production products that are necessary to simulate the one or more software applications on the meta-product.

5. The method of claim 3 wherein the applicative validation state allows updating and deleting data from the meta-product (334).

6. The method of claim 3 wherein the applicative validation state allows displaying by the one or more applications the meta-product as if it were a production product.

7. The method according to claim 1 wherein the customizable flow of one or more validation states allows setting the meta-product into the production state (328, 338).

8. The method according to claim 1 wherein the production state only allows an expert team to update the meta-product (342).

9. The method according to claim 8 wherein the production state allows updating any product (342).

10. The method according to claim 1 wherein the customizable flow of one or more validation states include only a manual validation state (350).

11. The method according to claim 1 wherein the production database is a database of fares (110) and the one or more software applications include a pricing engine (130).

12. A computer program product stored on a non-transitory computer readable storage medium, comprising computer readable code means for causing at least one computer to operate instructions comprising:
- requesting an issuance of a unique filing number associated to a draft state version of the plurality of updates keeping invisible to end-users of the production database, the plurality of updates;
- in the production database, creating or copying from the production database, a set of product items identified as a whole by the unique filing number and gathered under a form of a meta-product on which the plurality of updates is applied;
- in the production database, updating the meta-product on which the plurality of updates has been applied;
- when updating of the meta-product is complete, in the production database, successively setting into a customizable flow of one or more validation states the meta-product in order to perform a cross-validation of the plurality of updates, wherein the customizable flow of one or more validation states allows returning the meta-product to the draft state when cross-validation of the plurality of updates fail, each validation state qualifying actions are performed on the meta-product identified by the filing number, the validation state is a field stored in association with the filing number in a specific table;
- when validation of the meta-product is complete, setting into a production state the uniquely identified meta-product which becomes immediately visible and useable by the end-users of the one or more software applications;
- wherein said creating or copying step, said updating step, said validation step, and said setting step are each perform while the production database is concurrently accessed by the end-users; and
- wherein said meta-product cannot be accessed by the end-users during said creating or copying step, said updating step, and said validation step.

13. A server side or a client side of a computer program product stored on a non-transitory computer readable storage medium, comprising computer code means for causing at least one computer to operate instructions comprising:
- requesting an issuance of a unique filing number associated to a draft state version of the plurality of updates keeping invisible to end-users of the production database, the plurality of updates;
- in the production database, creating or copying from the production database, a set of product items identified as a whole by the unique filing number and gathered under a form of a meta-product on which the plurality of updates is applied;
- in the production database, updating the meta-product on which the plurality of updates has been applied;
- when updating of the meta-product is complete, in the production database, successively setting into a customizable flow of one or more validation states the meta-product in order to perform a cross-validation of the plurality of updates, wherein the customizable flow of one or more validation states allows returning the meta-product to the draft state when cross-validation of the plurality of updates fail, each validation state qualifying actions are performed on the meta-product identified by the filing number, the validation state is a field stored in association with the filing number in a specific table;
- when validation of the meta-product is complete, setting into a production state the uniquely identified meta-product which becomes immediately visible and useable by the end-users of the one or more software applications;
- wherein said creating or copying step, said updating step, said validation step, and said setting step are each perform while the production database is concurrently accessed by the end-users; and
- wherein said meta-product cannot be accessed by the end-users during said creating or copying step, said updating step, and said validation step.

14. The method of claim 2 wherein the customizable flow of one or more validation states includes an applicative validation state (330) which allows simulating the one or more software applications on the meta-product.

15. The method of claim 1, wherein when updating of the meta-product is complete, in the production database, contents of the meta-product are checked in an actual production environment before said setting step.

* * * * *